United States Patent [19]
Tsuzuki et al.

[11] 3,727,301
[45] Apr. 17, 1973

[54] TOOL RESERVING MAGAZINE FOR MACHINE TOOL

[75] Inventors: Sadaaki Tsuzuki; Yuzo Honda, both of Kariya, Japan

[73] Assignee: Toyoda Koki Kabushiki Kaisha, Kariya-shi, Aichi-ken, Japan

[22] Filed: Oct. 22, 1971

[21] Appl. No.: 191,685

[30] Foreign Application Priority Data

Oct. 23, 1970  Japan..............................45/105823

[52] U.S. Cl......................29/568, 29/26 A, 211/1.5
[51] Int. Cl. ................................................B23q 3/157
[58] Field of Search..............................29/568, 26 A; 211/1.5

[56] References Cited

UNITED STATES PATENTS

| 3,200,492 | 8/1965 | Lehmukuhl | 29/568 |
| 3,217,406 | 11/1965 | Dever | 29/568 |
| 3,587,165 | 6/1971 | Griffith | 29/568 |

*Primary Examiner*—Andrew R. Juhasz
*Assistant Examiner*—Z. R. Bilinsky
*Attorney*—Norman F. Oblon et al.

[57] ABSTRACT

Disclosed herein is a tool take-out apparatus for a tool reserving magazine including a plurality of tool receiver sockets mounted on endless chains stretched over a drive sprocket and guiding pulleys and displaceable tension pulleys for offsetting chain loosening produced in the course of operation time. The tool take-out apparatus comprises guiding track means for regulating moving directions of the endless chains, a supporting member adjustably mounted on the magazine and supporting the track means, adjusting means for properly positioning the supporting member, holding means mounted on the supporting member, a push rod reciprocatably mounted on the holding means with the axial line thereof kept coinciding with that of each of the sockets indexed to the tool take-out position, and operational means for reciprocating the push rod along its axial line.

5 Claims, 4 Drawing Figures

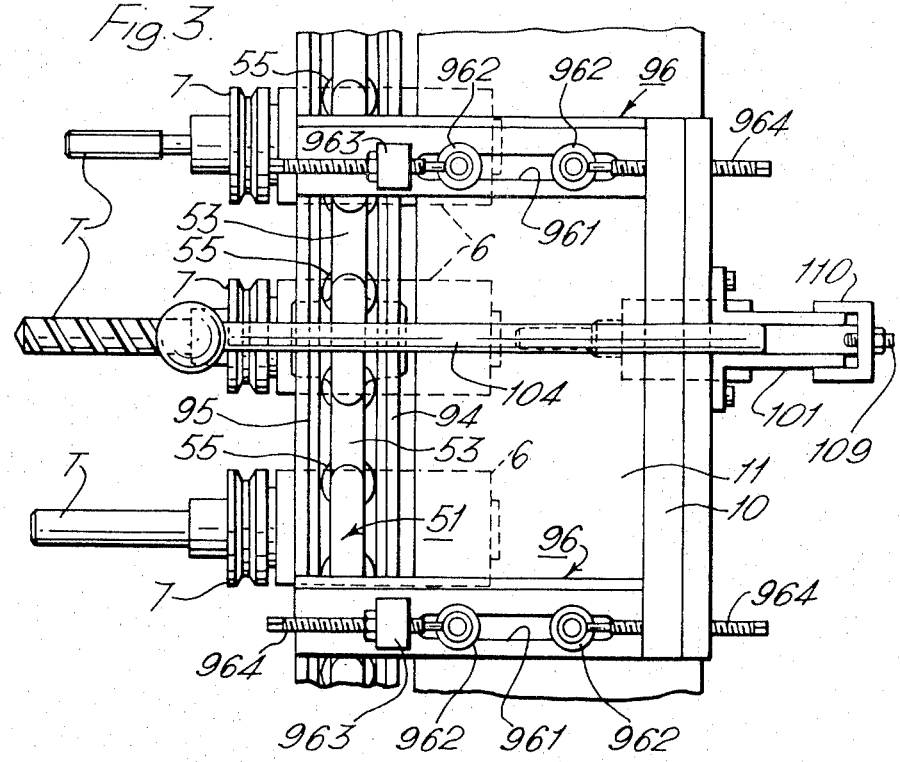
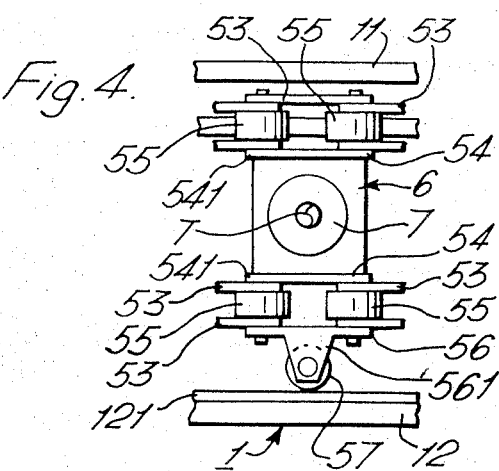

TOOL RESERVING MAGAZINE FOR MACHINE TOOL

BACKGROUND OF THE INVENTION

The present invention relates to a tool reserving magazine for machine tools, and more particularly to a tool take-out apparatus for a tool reserving magazine wherein a plurality of tool receiver sockets are provided on an endless driving chain and each socket can be positioned at a predetermined tool take-out position for discharging a tool therefrom.

In conventional machine tools having a tool reserving magazine for various kinds of tools, it is often necessary to change a certain tool reserved in the magazine due to a change of work pieces or to abrasion of the tool itself. For this purpose, a tool take-out apparatus is provided at a certain position of the tool reserving magazine.

In such tool storage magazines and more particularly in a chain operated magazine heretofore employed, a plurality of chain guiding pulleys have been provided to keep the chain stretched. One of the guiding pulleys works as a tension pulley to compensate for loosening of the chain that occurs over an extended period of operation.

The moving direction of the chain is displaced, however, when the tension pulley is adjusted in order to furnish the chain with the necessary proper tension. Consequently, tool receiver sockets secured on the chain cannot be positioned exactly relative to the tool take-out apparatus. Also, no coincidence of the axial line of the apparatus with the axial line of the sockets is obtained, and because of this, the tools cannot be smoothly taken out by means of the tool take-out apparatus.

SUMMARY OF THE INVENTION

An object of the present invention is, therefore, to provide a tool take-out apparatus for a tool reserving magazine including a plurality of tool receiver sockets mounted on endless chains stretched over a drive sprocket and guiding pulleys and displaceable tension pulleys for offsetting chain loosening produced in the course of operation time, wherein the axial line of the tool take-out apparatus is constantly kept in coincidence with that of one of the sockets indexed to the tool take-out position regardless of displacement of the chains by means of the tension pulleys, whereby any desired tool held in the sockets can easily and smoothly be taken out as required.

Another object of the present invention is to provide a tool take-out apparatus having the above-mentioned characteristics, wherein adjustment can easily be performed to constantly maintain the axial line of the apparatus in the predetermined direction.

Yet another object of the present invention is to provide a tool take-out apparatus having the above-mentioned characteristics, wherein the construction thereof is simple and compact, yet the operation is durably accurate.

According to the present invention briefly summarized, there is provided a tool reserving magazine having a magazine frame equipped on a machine tool, a driving sprocket journalled on the frame being driven by an indexing drive motor, a plurality of guiding pulleys rotatably mounted on the frame, at least one tension pulley adjustably journalled on the frame, a pair of upper and lower endless chains stretched over the sprocket and the pulleys, the lower chain including rotatable guiding means to support the chains on the frame, and a plurality of tool receiver sockets mounted on the chains to detachably receive a plurality of tool holders with various kinds of tools set therein, in which an improved tool take-out apparatus is provided which comprises, in combination, guiding track means for regulating moving directions of the chains, a supporting member adjustably mounted on the frame and supporting said track means, adjusting means for properly positioning the supporting member, holding means mounted on the supporting member, a push rod reciprocatably mounted on the holding means with the axial line thereof kept coinciding with that of each of the sockets being indexed to the tool take-out position, and operation means for reciprocating the push rod along its axial line.

BRIEF DESCRIPTION OF THE DRAWINGS

The foregoing and various other objects, features and attendant advantages of the present invention will be more fully appreciated as the same becomes better understood from the following description especially when considered in conjunction with the accompanying drawings in which like reference numerals designate like or corresponding parts throughout the several views, and wherein:

FIG. 3 is a plan view of FIG. 2 showing three of the tool receiver sockets with three different kinds of tools being set therein; and FIG. 4 is a side view taken along the direction indicated by an arrow mark IV in FIG. 2, wherein the construction of the chains is partially illustrated.

DESCRIPTION OF THE PREFERRED EMBODIMENT

Figure 1:
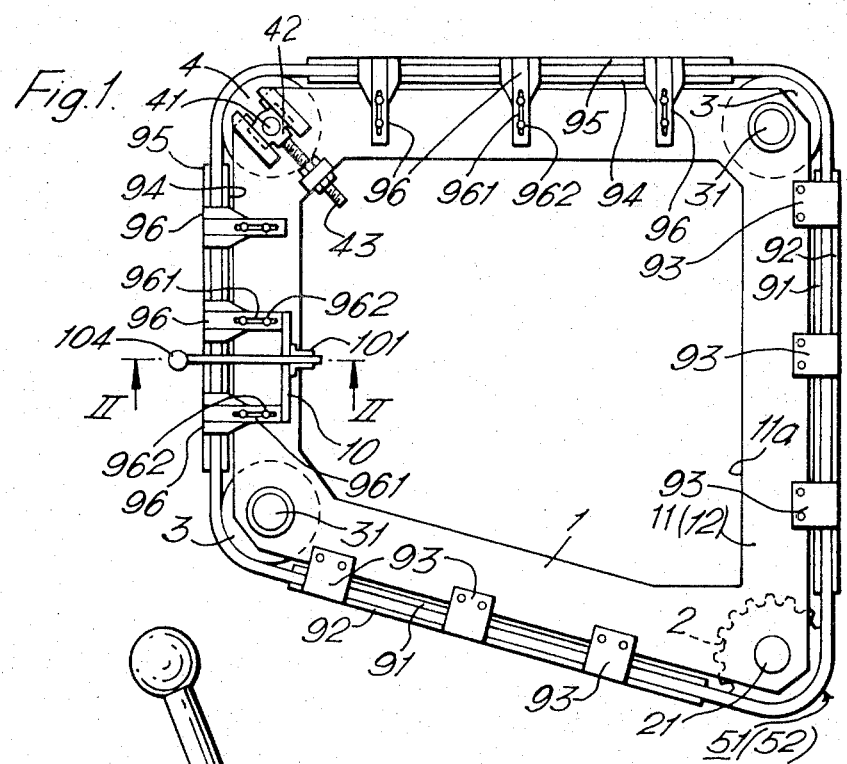
FIG. 1 is a plan view of a tool reserving magazine constructed in accordance with the present invention, wherein a general arrangement of the parts of the magazine is illustrated.

Referring now to the drawing and more particularly to FIG. 1, there is shown a tool reserving magazine frame 1 which comprises an upper frame plate 11 and a parallel lower frame plate 12, each of the plates 11 and 12 being cut open at the central portions 11a thereof. The tool reserving magazine frame 1 further includes a driving sprocket device 2 shown being disposed at its lower right-hand corner in FIG. 1. The driving sprocket device 2 has two sprocket wheels at its lower and upper portions, respectively, being so arranged on a driving shaft 21 vertically and rotatably journalled on the frame plates 11 and 12 as to rotate synchronously. The driving shaft 21 is driven by an indexing drive-motor or the like, not shown, for rotating the driving shaft 21 and in turn the sprocket wheels fixedly engaged thereon.

Still in FIG. 1, at the upper right and lower left corners of the tool reserving, or storing, magazine frame 1, two guiding pulleys 3 are rotatably installed on a pair of supporting shafts 31 vertically disposed in the frame plates 11 and 12. Provided at the upper left corner of the magazine frame 1 is a tension pulley 4 being fixed on a supporting shaft 41. The supporting shaft 41 is rotatably journalled on a sliding base 42 which is slidably mounted on the magazine frame 1 for movement only in a generally radial direction from the approximate center of the cut-out portions 11a. The sliding base 42 is connected with an adjusting screw 43 adjustably threaded into the upper frame plate 11, the connection between the sliding base 42 and the adjusting screw 43 being made in a particular manner, wherein the sliding base 42 is capable of making only relative movement axially of the rotating adjusting screw 43.

Figure 2:
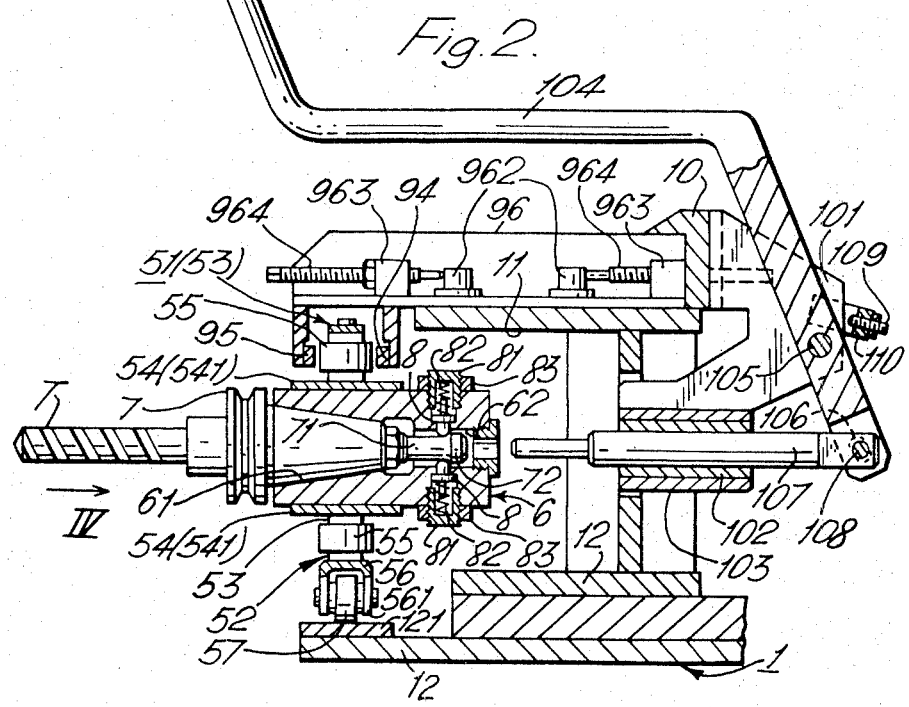
FIG. 2 shows a view of an enlarged elevational cross section taken from the II II line of FIG. 1, wherein there is depicted a mechanical construction of a tool receiver socket with a tool set therein and the tool take-out apparatus.

Reference is now made to FIG. 2, wherein upper and lower endless chains 51 and 52, respectively, are shown being rotatably stretched along an outer face of the magazine frame 1 as they pass over the sprocket wheels, the two guiding pulleys 3 and the tension pulley 4. As particularly shown in FIGS. 2 and 4, each of the endless chains 51 and 52 is formed of ordinary pairs of parallel chain links 53 being spaced apart and connected alternately with each other by chain links 54 and 56 disposed on opposite sides of each pair of links 53 by pins passing therethrough and through chain rollers 55 positioned between the ends of each pair of links 53, and the chain links 54 are provided with two fixing portions 541 projecting respectively from the right and left sides thereof. Weight holding rollers 57 are provided on bottom links 56 being disposed on the opposite side of the lower endless chain 52 from the chain links 54 and these rollers 57 are supported on depending rollers holders 561 of the links 56 being rotatable only in the moving direction of the chain 52.

Each of the tool receiver sockets 6 is insertingly fastened between the fixing portions 541 of one of the upper chain links 54 and the fixing portions of one of the lower chain links 54 in a corresponding position. A tapered or conical hole 61 is provided within the tool receiver socket 6 for detachably receiving a tool holder 7 holding a tool T therein.

Two opposing locking pins 8 are provided within the tool receiver socket 6 at the rear portion thereof having half-spherical head portions being reciprocatably engaged respectively with a securing bore 62 in the rear portion of the tool receiver socket 6 coaxial with the conical hole 61. Both of the locking pins 8 are normally biased inwardly of the bore 62 by coiled springs 82, the biasing forces of which are adjustable by means of adjusting bolts 81 firmly fixed to the tool receiver socket 6 by nuts 83.

Thus, when the tool holder 7 holding the tool T therein is inserted fully into the tool receiver socket 6, an enlarged end portion 72 of a securing rod 71 extending from the rear end portion of the tool holder 7 is firmly yet detachably locked therein by the locking pins 8.

Two sets of an inner fixed-track 91 and an outer fixed-track 92 are secured, respectively, along the right side edge and the lower side edge of the upper frame plate 11, as viewed in FIG. 1, by means of supporting members 93. The supporting members 93 are firmly secured onto the upper frame plate 11. Respectively along the left side edge and the upper side edge of the upper frame plate 11, as viewed in FIG. 1, two sets of an inner adjustable-track 94 and an outer adjustable-track 95 are supported by means of supporting members 96. Each of the supporting members 96 is adjustably secured on the upper frame plate 11 by two fastening bolts 962. One end of each bolt 962 extends through an elongate slit 961 provided on the supporting member 96 and is threadedly engaged with the upper frame plate 11. The supporting members 96 are positioned by positioning screws 964 which are engaged with the bolts 962 and are adjustably threaded into nuts 963 fixed on the supporting member 96, as is well shown in FIGS. 2 and 3.

Thus, the fixed-tracks 91 and 92 and the adjustable-tracks 94 and 95 constantly guide the chain rollers 55 of the upper chain 51 to regulate the movement of the upper chain 51, thus preventing any possible rightward and leftward oscillations of the upper and lower chains 51 and 52. A lower track 121 runs on the upper side of the lower frame plate 12 completely circumventing the outer edge thereof. The lower track 121 guides the weight supporting rollers 57 so that the total weight of the tools T, the tool holders 7, and the upper and lower chains 51 and 52, including the tool receiver sockets 6, is supported by the lower track 121 through the weight supporting rollers 57.

A frame body 10 of a tool take-out apparatus is fixed to the rear end portions of the two adjustable-track supporting members 96 in parallel relation with the inner and outer adjustable-tracks 94 and 95, as shown in FIG. 3. The frame body 10 has a pair of holding brackets 101 fastened to the central portion of the rear side thereof. At the lower end portion of the holding brackets 101 there is provided a supporting pipe member 103, as shown in FIG. 2, within which a bushing 102 is received so that the axial line of the bushing 102 coincides with that of the tool receiver socket 6.

Reference is now made to FIG. 2 wherein an operation lever 104 is shown being swingable between the holding brackets 101 by a pivot shaft 105. An elliptical hole 106 is drilled through the lower end portion of the operation lever 104 and a push rod 107 reciprocatable within the bushing 102 inside the supporting pipe member 103 is operably connected with the operation lever 104 by a connecting pin 108 extending therethrough. This lets the left tip end of the push rod 107 pass into the securing hole 62 of the tool receiver socket 6 when the operation lever is raised, whereupon the tool T in the tool receiver socket 6 can be pushed outward or to the left, as viewed in FIG. 2.

The frame body 10 of the tool take-out apparatus includes a stop means 109 adjustably threaded into a stop holder 110 which is firmly fixed to the brackets 101 at the rear end thereof. The stop means 109 regulates the swinging distance of the operation lever 104 and in turn the thrusting distance of the push rod 107.

The operation of the embodiment of the present invention described herein is set forth in detail hereinbelow.

In the tool reserving magazine frame 1, various kinds of necessary tools T are respectively engaged within the tool receiver sockets 6 positioned between the upper and lower chains 51 and 52. In setting a tool T, the tool holder 7 holding the tool T therein is forcibly pushed into the tapered hole 61 of the tool receiver socket 6 until the enlarged end portion 72 of the securing rod 71 is pushed into the securing hole 62 of the tool receiver socket 6, whereupon the two locking pins 8 are respectively retracted against the biasing force of the springs 82. The enlarged end portion 72 thus becomes firmly locked by two locking pins 8 such that the tool T is securedly kept in the position therefor.

When it becomes necessary to take out a certain one of the tools T from the tool reserving magazine 1 at the delivery place thereof, the driving shaft 21 is driven by the indexing drive-motor or the like. Rotation of the driving shaft 21 operates the driving sprocket wheels and the upper and lower chains 51 and 52 are consequently driven to position the desired tool at the tool take-out apparatus. The operation lever 104 is then turned clockwise or upward. This swing of the operation lever 104 causes a leftward movement of the lower portion of the operation lever, thereby sliding the push rod 107 leftward within the bushing 102 of the supporting pipe member 103.

The tip end portion of the push rod 107 is thus smoothly inserted into the securing hole 62 of the tool receiver socket 6, causing the enlarged end portion 72 of the securing rod 71 to release the locking of the tool holder by the two locking pins 8 by retracting the same against the biasing force of the springs 82. The tool T, together with the tool holder 7, may then be easily taken out from the tapered hole 61. After the desired tool T is removed, the operation lever 104 is swung counterclockwise to its original position illustrated in FIG. 2, and if desired, another essential tool may be placed into the tool receiver socket 6, which is now empty. This process is easily repeated as often as necessary to change the tools for accommodating workpiece changes or abrasion of the tools themselves.

Periodically, the upper and lower chains 51 and 52 become loose in the course of their operation, especially after continued use. When this occurs, the tension pulley 4 is displaced outward by means of the adjusting screw 43 to produce the tension required for offsetting the looseness of the chain. In properly adjusting the tension pulley 4, it is best to first loosen the positioning screws 964 that regulate the positioning of the movable-track supporting members 96 which support the two sets of the inner and outer adjustable-tracks 94 and 95.

By loosening the positioning screws 964, the adjustable-track supporting member 96 is free to shift. Consequently, in response to the displacement of the tension pulley 4, not only are the upper and lower chains 51 and 52 shifted, but also the guiding direction of the inner and outer adjustable-tracks 94 and 95 is automatically adjusted to the corresponding direction by the chain rollers 55. After such adjustment and shifting to provide the necessary tension for the upper and lower chains 51 and 52, the movable-track supporting members 96 are firmly fastened by retightening the positioning screws 964. At this time, the positioning screws 964 are capable of making a fine adjustment to hold the parallel position between the chain 51 and the movable-tracks 94 and 95. Thus, in turn, maintains the coincidence of the axial line of the tool receiver socket 6 with that of the push rod 107.

As described in detail hereinabove, in the tool take-out apparatus constructed in accordance with the present invention, the relative position of the push rod 107 to the tool receiver socket 6 can be maintained unchanged, whereby any desired tool can always be taken out without any difficulty.

From the description above, it is clear that the tool take-out apparatus is installed as a unit on the adjustable-track supporting members by which are supported the inner and outer adjustable-tracks for regulating and guiding the moving direction of the upper chain. Consequently, even if the direction of the inner and outer adjustable-tracks is displaced outward in order to adjust the tension of the upper and lower chains, the position of the tool take-out apparatus is also automatically adjusted and shifted in response to the displacement of the movable-tracks. Thus, the relative position between the push rod connected to the operation lever and the tool receiver sockets connected as a unit to the upper and lower chains is continually maintained. This maintains constant coincidence of the axial line of the push rod connected to the operation lever with the axial line of the securing hole of the tool receiver socket.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described here. Accordingly,

What is claimed as new and desired to be secured by Letters Patent of the United States is:

1. A tool reserving magazine for a machine tool comprising:
   a magazine frame for said machine tool;
   a motor-driven driving sprocket journalled on said frame;
   a plurality of guiding pulleys rotatably mounted on said frame;
   at least one tension pulley adjustably jouranlled on said frame;
   a pair of upper and lower endless chains stretched over said sprocket and said pulleys;
   rotatable guiding means for said lower chain supporting said chains on said frame;
   a plurality of tool receiver sockets mounted on said chains to detachably receive a plurality of holders for various kinds of tools; and,
   a tool take-out apparatus which comprises guiding track means for regulating moving directions of said chains, supporting means adjustably mounted on said frame and supporting said track means, means for adjusting the positioning of said supporting means on said frame, holding means mounted on said supporting means, a push rod reciprocatably mounted on said holding means with the axial line thereof kept coinciding with that of each of said sockets indexed to the tool take-out position, and operation means for reciprocating said push rod along its axial line.

2. A tool reserving magazine for a machine tool as set forth in claim 1, wherein said adjusting means of said tool take-out apparatus comprises:
   a pair of bolts threaded into said frame through said supporting means; and,
   a pair of adjusting screws threaded respectively in a pair of nuts fixed on said supporting means with the tips of said screws engaging the head portions of said bolts;

whereby said supporting means is secured on said frame at the proper position by fastening said bolts into said frame after said supporting means is adjusted.

3. A tool reserving magazine for a machine tool as set forth in claim 1, wherein said holding means of said tool take-out apparatus comprises:

a frame body secured on the rear portion of said supporting means to be parallel with said track means; and, a bracket mounted on said frame body to hold said push rod therein in coaxial alignment with said tool receiver socket.

4. A tool reserving magazine for a machine tool as set forth in claim 3, wherein said operation means of said tool take-out apparatus comprises an operation lever pivoted on said bracket and operatively connected with said push rod.

5. A tool reserving magazine for a machine tool as set forth in claim 1, wherein said rotatable guiding means comprises a plurality of rollers journalled on roller holders provided on the bottom portion of said lower chain being rotatable only in the moving directions of said endless chains, said rollers being supported by a track mounted on the lower portion of said magazine frame.

* * * * *